US007366328B2

(12) United States Patent
Hamid et al.

(10) Patent No.: US 7,366,328 B2
(45) Date of Patent: *Apr. 29, 2008

(54) METHOD AND DEVICE FOR PREVENTING FALSE ACCEPTANCE OF LATENT FINGERPRINT IMAGES

(75) Inventors: Laurence Hamid, Ottawa (CA); John Boyer, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 11/681,090

(22) Filed: Mar. 1, 2007

(65) Prior Publication Data

US 2007/0147669 A1    Jun. 28, 2007

Related U.S. Application Data

(63) Continuation of application No. 11/410,792, filed on Apr. 25, 2006, now abandoned, which is a continuation of application No. 10/133,499, filed on Apr. 29, 2002, now Pat. No. 7,039,224.

(51) Int. Cl.
*G06K 9/00* (2006.01)
*H04K 1/00* (2006.01)

(52) U.S. Cl. ............... 382/115; 382/124; 713/186; 340/5.52; 340/5.82

(58) Field of Classification Search ........ 382/115–127; 713/102, 186; 902/3–6; 235/380, 382, 382.5; 340/5.52, 5.53, 5.8–5.86
See application file for complete search history.

(56) References Cited

U.S. PATENT DOCUMENTS 4,353,056 A    10/1982  Tsikos ................... 382/124
4,827,527 A    5/1989   Morita et al. ........... 382/127
4,872,203 A *  10/1989  Asai et al. .............. 383/4
5,088,817 A *  2/1992   Igaki et al. ............. 356/71
5,109,427 A    4/1992   Yang ..................... 382/127
5,187,482 A    2/1993   Tiemann et al. ......... 341/143
5,187,748 A    2/1993   Lee ...................... 382/127
5,233,404 A    8/1993   Lougheed et al. ........ 356/71
5,325,442 A    6/1994   Knapp ................... 382/124
5,778,089 A    7/1998   Borza ................... 382/124
6,035,398 A    3/2000   Bjorn ................... 713/186
6,084,977 A    7/2000   Borza ................... 382/124
6,247,813 B1 * 6/2001   Kim et al. .............. 351/206

(Continued)

FOREIGN PATENT DOCUMENTS

WO    WO 99/51138 A2    10/1999

(Continued)

*Primary Examiner*—Aaron W Carter
(74) *Attorney, Agent, or Firm*—Perkins Coie LLP

(57) ABSTRACT

Disclosed is a method for detecting a latent fingerprint image provided to a biometric input device of a fingerprint based security system. First and second images of the fingerprint are captured during a time period interval Δt. At least one of the first and second images are analyzed to identify an extractable feature within a global reference frame, the extractable feature usable for authenticating an individual. The first and second images are compared one with the other to determine differences indicative of motion about the identified extractable feature within a local reference frame during the time period interval Δt. Absent motion about the identified extractable feature being detected, the fingerprint is registered as a latent fingerprint and cannot be used to authenticate the individual who is seeking authorization.

58 Claims, 4 Drawing Sheets

U.S. PATENT DOCUMENTS

| | | | |
|---|---|---|---|
| 6,433,818 B1 * | 8/2002 | Steinberg et al. | 348/161 |
| 6,535,622 B1 | 3/2003 | Russo et al. | 382/124 |
| 6,785,406 B1 * | 8/2004 | Kamada | 382/117 |
| 6,922,478 B1 * | 7/2005 | Konen et al. | 382/115 |
| 7,039,224 B2 * | 5/2006 | Hamid et al. | 382/124 |
| 7,181,052 B2 * | 2/2007 | Fujieda | 382/124 |
| 2001/0026632 A1 * | 10/2001 | Tamai | 382/116 |
| 2002/0030359 A1 | 3/2002 | Bergenek et al. | 283/68 |
| 2002/0050713 A1 | 5/2002 | Bergenek et al. | 283/68 |
| 2003/0053662 A1 * | 3/2003 | Evoy et al. | 382/115 |
| 2007/0081698 A1 * | 4/2007 | Hamid et al. | 382/124 |

FOREIGN PATENT DOCUMENTS

| | | |
|---|---|---|
| WO | WO 01/84478 A1 | 11/2001 |

* cited by examiner

METHOD AND DEVICE FOR PREVENTING FALSE ACCEPTANCE OF LATENT FINGERPRINT IMAGES

CROSS-REFERENCE TO RELATED APPLICATIONS

This application is a continuation of U.S. application Ser. No. 11/410,792, filed Apr. 25, 2006, now abandoned, which is a continuation of U.S. application Ser. No. 10/133,499, filed Apr. 29, 2002, now Pat. No. 7,039,224.

FIELD OF THE INVENTION

This invention relates generally to imaging devices and more particularly to contact imaging devices for imaging fingerprints and the like.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require knowledge of an entry code that has been selected by a user or has been configured in advance.

Pre-set codes are often forgotten, as users have no reliable method of remembering them. Writing down the codes and storing them in close proximity to an access control device (i.e. a combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords which are relatively insecure. As such, many password systems are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building access or information-access of individuals to buildings, rooms, and devices such as computer terminals.

One of the problems associated with fingerprint sensors concerns the reliable and accurate transformation of the ridge-and-valley pattern of the fingertip into electrical or optical signals to be stored in a digital format. Optical systems as described above, for example using a prism, require sophisticated equipment and tend to be bulky and costly.

In an attempt to overcome some of the limitations and disadvantages of using optical systems based on illumination of the finger tip, U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced-apart electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

In yet another attempt to improve upon deficiencies and limitations of the aforementioned and other prior art, a further contact imaging device is described in U.S. Pat. No. 5,325,442 in the name of Knapp, issued Jun. 28, 1994. Knapp describes making a capacitance measuring imaging device in the form of a single large active matrix array involving deposition and definition by photolithographic processes of a number of layers on a single large insulating substrate. Electrodes and sets of address conductors formed of metal and field effect transistors are formed as amorphous silicon or polycrystalline silicon thin film transistors (TFTs) using an appropriate substrate of, for example, glass or quartz.

A fingerprint sensing device and recognition system that includes an array of closely spaced apart sensing elements each comprising a sensing electrode and an amplifier circuit is described in U.S. Pat. No. 5,778,089 in the name of Borza, issued Jul. 7, 1998. The device is used to sense electrical charge on a fingertip and obviates the need to pre-charge the sensing electrode. The device may be constructed with a single die or with multiple dies.

It is a disadvantage of prior art fingerprint sensing devices that when used, the user leaves a latent fingerprint, similar to the type of fingerprints used by police to identify suspects at crime scenes. Thus, it is a problem that an unauthorized person can place a piece of paper over, for example, an optical fingerprint imager and the device will image the latent fingerprint and falsely identify the unauthorized person.

U.S. Pat. No. 6,084,977, issued to Borza Jul. 4, 2000, provides a method for detecting a record-playback attack in which an exact copy of a previously provided fingerprint is provided to a fingerprint-imaging device. An example of such an exact copy is a latent fingerprint left on the imaging platen. Unfortunately, an unauthorized individual could simply replace an existing biometric input device with a different biometric input device having a latent fingerprint image on a platen surface thereof. The system does not recognize the latent fingerprint image as such because an exact copy, used previously to authenticate a user, does not exist in the system memory. Of course, a fingerprint recognition system that includes a plurality of remotely located terminals, each terminal in communication with a central information database, is not necessarily susceptible to this particular limitation.

It is a further limitation of the prior art that, by altering a latent fingerprint slightly and in a manner that does not affect authentication, an unauthorized user will be falsely authenticated. For instance, the unauthorized user wipes away or smudges a portion of the fingerprint around the periphery thereof, but leave the core intact for authentication purposes. As such, the latent fingerprint is other than an exact copy of a previously imaged fingerprint, and authentication is still possible because the core is intact.

It would be advantageous to provide a method for preventing use of latent fingerprints in user authentication for contact imaging devices. In particular, it would be advantageous to provide a method, which method recognizes a latent fingerprint in dependence upon a same region of a fingerprint that is used to authenticate the individual providing the fingerprint.

OBJECT OF THE INVENTION

Thus, in an attempt to overcome these and other limitations of known prior art devices, it is an object of this invention to provide a contact imaging device that is relatively inexpensive and practicable to manufacture that prevents user authorization based on latent fingerprints.

It is a further object of the invention to provide a method of preventing user authentication based on latent fingerprints.

SUMMARY OF THE INVENTION

In accordance with a broad embodiment of the invention, user authorization information is analyzed to extract therefrom information that varies during the collection thereof. The user authorization information is registered as pre-recorded user authorization information when analysis indicates an amount of variation of the information that is below a predetermined threshold amount.

In accordance with an embodiment of the invention there is provided a method for preventing false acceptance of latent biometric information provided to a biometric information input device having a platen, comprising the steps of:
  a) sensing first biometric information provided to the biometric information input device from a first portion of a biometric information source;
  b) sensing second biometric information provided to the biometric information input device from a second portion of the biometric information source, each of the first and second portions including an overlapping same portion of the biometric information source, the first and second biometric information received at a different time one from the other;
  c) analyzing at least one of the first and second biometric information to identify a feature within the overlapping same portion for determining a global reference frame for use in characterizing the at least one of the first and second biometric information;
  d) determining first data relating to the feature within the first biometric information and determining second data relating to the same feature within the second biometric information;
  e) comparing the first and second data to detect a difference between the first and second biometric information; and,
  f) determining the biometric information source as a live biometric information source in dependence upon the detected difference.

In accordance with another embodiment of the invention there is further provided a method for preventing false acceptance of latent biometric information provided to a biometric information input device, comprising the steps of:
  a) capturing a first image of a biometric information source;
  b) capturing a second image of the biometric information source at least partially overlapping the first image of the biometric information source, the first and second images captured at a different time one from the other;
  c) identifying a same extractable feature in each of the first and second images, the extractable feature useable for determining a global reference frame;
  d) comparing the first and second images to detect relative motion of or about the extractable feature; and,
  determining the biometric information source as a live biometric information source in dependence upon the detected relative motion.

BRIEF DESCRIPTION OF THE DRAWINGS

Exemplary embodiments of the invention will now be described in conjunction with the following drawings, in which.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
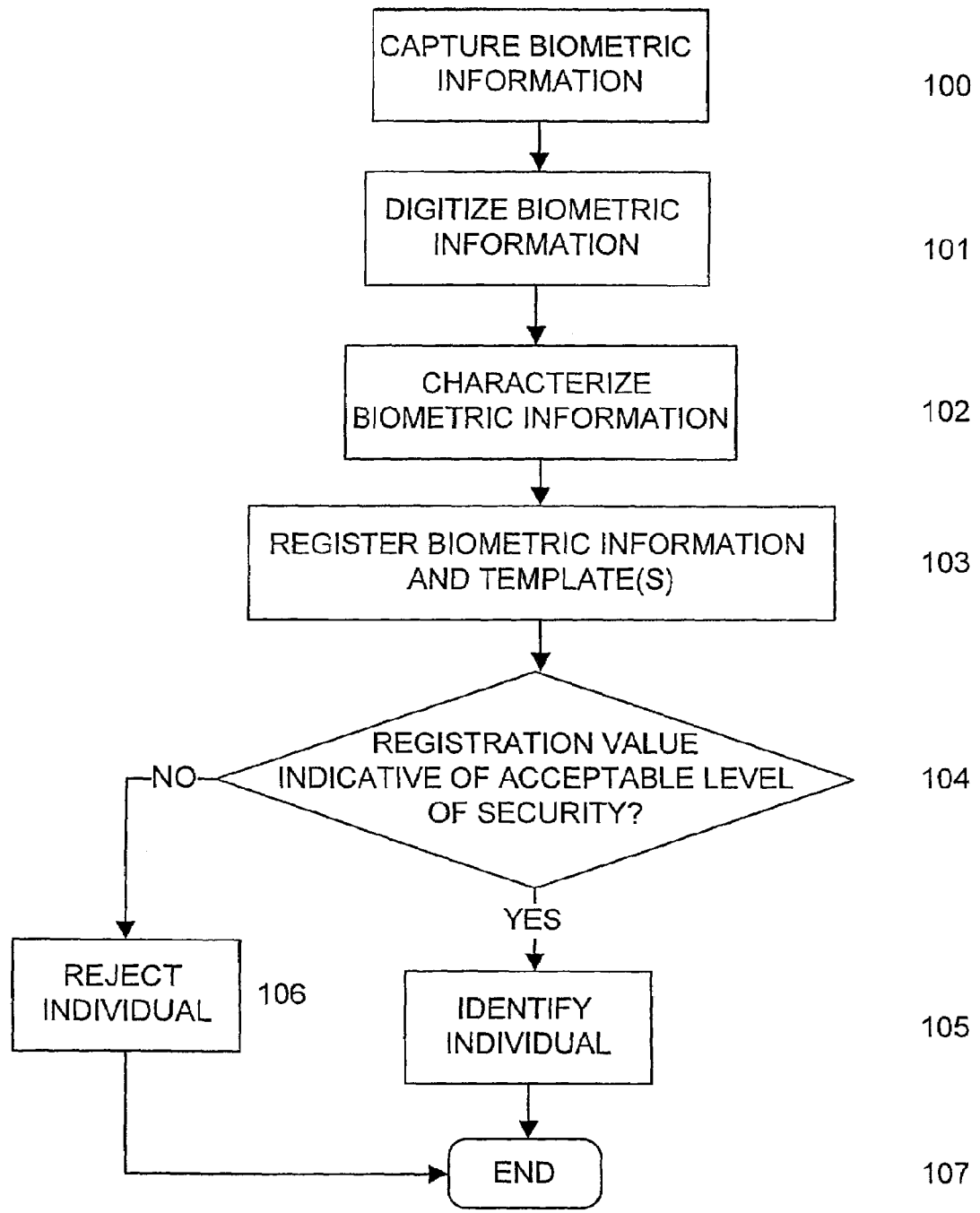
FIG. 1 is a simplified flow diagram of a method of identifying an individual based on captured biometric information according to the prior art.

Referring to FIG. 1, shown is a prior art method for authenticating an individual in dependence upon biometric information provided by the individual to be authenticated.

Biometric information in the form of a fingerprint is captured at step 100 using a biometric information input device in the form of a contact imager, Contact imagers, as described above, are known in the art of electronic security. The fingerprint is digitized at step 101 and the digitized fingerprint is characterized at step 102. Characterization of fingerprints is known in the art of fingerprint analysis and, in general involves extracting features in a substantially global reference frame for comparison against template features. Typically, the global reference frame is determined based on an identifiable feature within the fingerprint in the form of a core of the fingerprint.

At step 103 the characterized biometric information is registered with stored templates to locate a template that, within a predetermined level of security in the form of a predetermined false acceptance rate, matches the characterized biometric information. When it is determined at step 104 that the characterized biometric information matches a stored template within the predetermined level of security, the individual is identified and a corresponding action is performed at step 105. Examples of corresponding actions include: granting system access; unlocking a door; logging access of the user; providing personal information; billing the individual, etc. Of course, when other than a match within the predetermined level of security is determined at step 104, a step 106 of rejecting the individual is performed. The method of FIG. 1 terminates at step 107.

Unfortunately, by providing biometric information at step 100 an individual leaves a latent fingerprint image on the platen, which is an exact copy of the actual fingerprint of that individual and is analogous to the type of fingerprints that are used by law enforcement agencies to identify a suspect that was present at a crime scene. It is a disadvantage of prior art methods that an unauthorized individual, arriving at some time after the authorized individual is authenticated, may use such a latent fingerprint to "playback" biometric information and be falsely authenticated in dependence thereof. Providing a facsimile of biometric information belonging to another, authorized individual in order to gain access to a system is a common form of breaching security. Even more problematic is that an unauthorized individual does not need to know all identity of an authorized user. Simply waiting until someone is provided access and then replaying their latent fingerprint provides access. Sometimes replaying of a fingerprint involves simply covering the platen with a homogeneous surface to cause the taunt fingerprint to be imaged.

Figure 2:
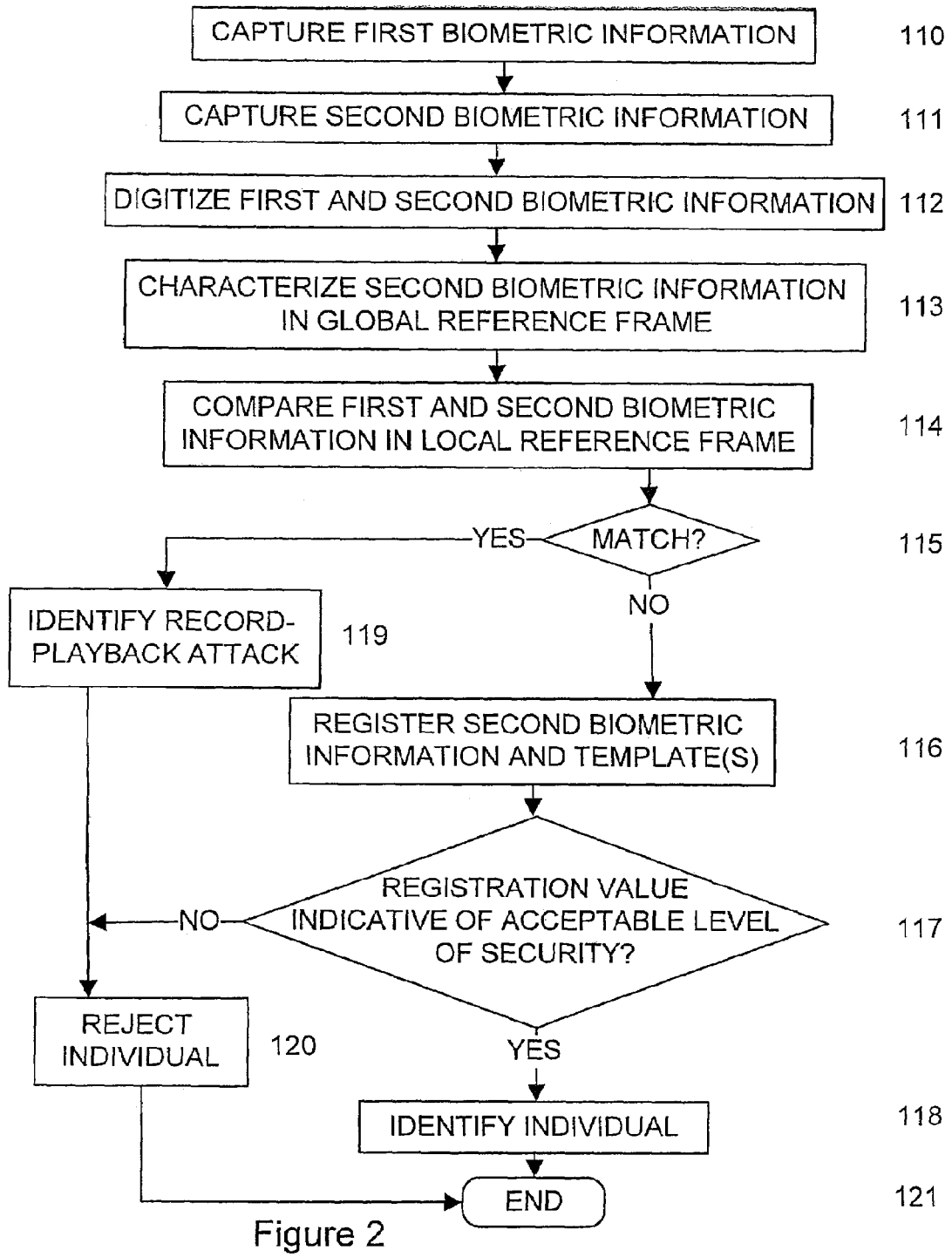
FIG. 2 is a simplified flow diagram of a method of identifying an individual based on captured biometric information with play-back detection according to the instant invention.

Referring now to FIG. 2, shown is a simplified flow diagram of a method for detecting record-playback of a latent fingerprint image according to the instant invention. The method of FIG. 2 is applicable to contact imagers in general. Contact imagers, as described above, are known in the art of electronic security.

Referring still to FIG. 2, first biometric information in the form of a fingerprint of a fingertip is captured at step 110 using a biometric information input device in the form of a contact imager. Second biometric information in the form of a fingerprint of a same fingertip is captured at step 111 using a same biometric information input device in the form of a same contact imager. For instance, the first and second biometric information comprise first and second substantially overlapping images of the fingerprint that is presented to the input device, each fingerprint image captured separately in a substantially local reference frame. In a preferred embodiment, each one of the first and second substantially overlapping images of the fingerprint includes a same identifiable feature, such as a core of the fingerprint. The first biometric information and the second biometric information are captured at a different time one from the other during a time period interval At, during which time period the fingertip remains in continuous contact with the contact imager.

The first and second biometric information, in the form of first and second fingerprint images, are digitized at step 112. At step 113 the second digitized fingerprint is characterized. Characterization of fingerprints is known in the art of fingerprint analysis and, in general involves extracting features in a substantially global reference frame for comparison against template features. In a preferred embodiment of the instant invention, the step of characterization includes the steps of identifying and extracting features indicative of the core of the fingerprint. The core provides data that is relatively more reliable for determining a global reference frame for identifying users of a fingerprint identification system compared to the peripheral regions of the fingerprint. Optionally, the peripheral regions of the fingerprint are cropped during the characterization step, such that only those features originating within the core are extracted, resulting in a minimized set of features being obtained.

At step 114 the first and second biometric information samples are compared one with the other to detect changes of the globally extracted features occurring within the local reference frame. For instance, the step 113 of characterizing the second biometric information includes a step of extracting features including the core of the fingerprint and/or minutiae in close proximity to the core, and a step of hashing data indicative of the extracted features. The comparison step 114 comprises a step of hashing a same area of the first biometric information and a step of comparing the first and second hashed data to detect differences therebetween. Optionally, step 113 does not include a step of hashing data indicative of the extracted features, and accordingly the features that are extracted in the global reference frame are compared in their local reference frame directly at step 114.

When it is determined at decision step 115 that the first and second biometric information samples share a core that is substantially an exact match, then a record-playback attack is identified at step 119 and the biometric information source is registered as a latent fingerprint. When other than a match is determined at decision step 115, then at step 116 the characterized second biometric information is registered with stored templates to locate a template that, within a predetermined level of security in the form of a predetermined false acceptance rate, matches the characterized second biometric information. When it is determined at decision step 117 that the characterized second biometric information matches a stored template within the predetermined level of security, the individual is identified and a corresponding action is performed at step 118. Examples of corresponding actions include: granting system access; unlocking a door; logging access of the user; providing personal information; billing the individual, etc. Of course, when other than a match within the predetermined level of security is determined at decision step 117, a step 120 of rejecting the individual is performed. The method of FIG. 2 terminates at step 121.

According to the method of FIG. 2, features, which are extracted in a global reference frame, are compared in order to detect changes that are occurring within a local reference frame during acquisition of fingerprint data. In particular, changes that occur during the time interval At between capture of a first image of a fingerprint and a second overlapping image of the same fingerprint are detected.

Since it is statistically very unlikely that two images of a fingerprint that are captured during a time period interval of At will be identical, a live biometric source is recognized in dependence upon differences being detected between the first and second captured fingerprint images. In particular, variations in the force that the user applies to the fingertip will cause the ridge-and-valley pattern of the fingerprint image to change slightly during the time period interval At between capture of the first image and capture of the second image. As such, a fingerprint received from a live biometric source is expected to display motion of at least some of the features either relative to other features in changes within features or predetermined types of motions. Types of motion include deformation of the fingerprint ridges, and/or rotational and/or translational motion of the entire fingerprint image with respect to the platen.

It is an advantage of the method according to FIG. 2 that live biometric sources are identified in dependence upon detected differences within the core region of the fingerprint, which core region is also used to authenticate the user. As such, an attempt by an unauthorized individual to modify the core data so as to induce changes therein may result in a latent fingerprint being accepted as a live fingerprint, however the core data, which is used to authenticate a user, will be altered and authentication will not occur. Advantageously, an unauthorized individual is prevented from simply "smudging" the peripheral region of a latent fingerprint in an attempt to "change" a latent fingerprint during image capture. Of course, when a global feature other than the core is used in the authorization process, movement and/or changes in the fingerprint about the global feature are analyzed to determine an absence of a latent fingerprint playback attack on the system.

Figure 3:
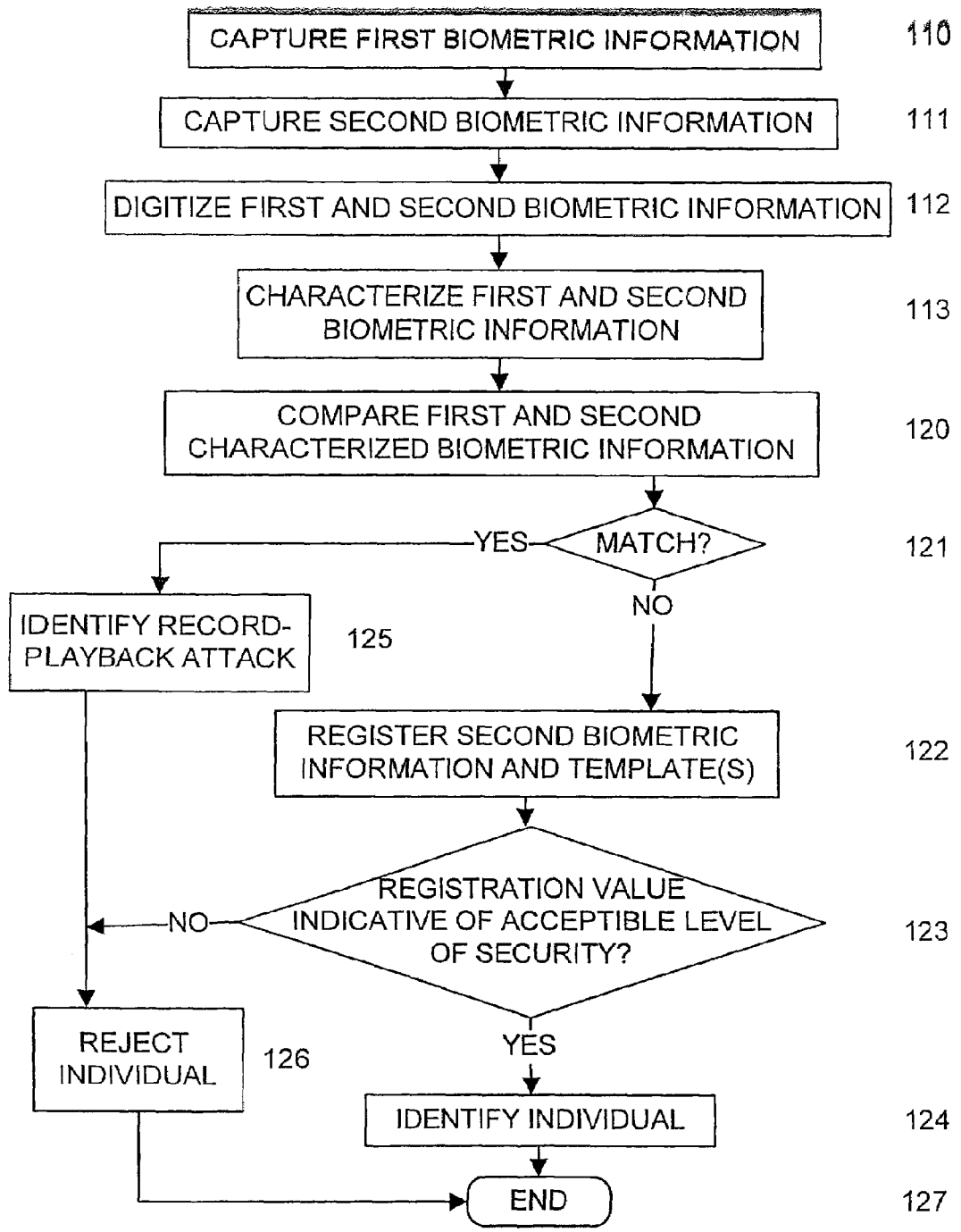
FIG. 3 is a simplified flow diagram of a method of identifying an individual based on captured biometric information with play-back detection according to the instant invention; and, FIG. 4 is a simplified flow diagram of a method of identifying an individual based on captured biometric information with play-back detection according to the instant invention.

Referring now to FIG. 3, shown is a simplified flow diagram of a method for detecting record-playback of a latent fingerprint image according to the instant invention. The method of FIG. 3 is applicable to contact imagers in general. Contact imagers, as described above, are known in the art of electronic security.

Referring again to FIG. 3, first biometric information in the form of a fingerprint of a fingertip is captured at step 110 using a biometric information input device in the form of a contact imager. Second biometric information in the form of a fingerprint of a same fingertip is captured at step 111 using a same biometric information input device in the form of a same contact imager. For instance, the first and second biometric information comprise first and second images of a same fingertip presented to the input device, each fingerprint image captured separately and having a local reference frame. In a preferred embodiment, each one of the first and second images of the fingerprint includes a same identifiable feature within the fingerprint, such as a core of the fingerprint. The first biometric information and the second biometric information are captured at a different time one from the other during a time period interval At, during which time period the fingertip remains in continuous contact with the contact imager.

The first and second biometric information, in the form of first and second fingerprint images, are digitized at step 112. At step 113 the first and second digitized fingerprints are characterized separately. Characterization of fingerprints is known in the art of fingerprint analysis and, in general involves extracting features in a substantially global reference frame for comparison against template features. In a preferred embodiment of the instant invention, the characterization step 113 includes the steps of identifying and extracting features that are indicative of the core of the fingerprint. The core provides data that is relatively more reliable for determining a global reference frame for identifying users of a fingerprint identification system compared to the peripheral regions of the fingerprint. Optionally, the peripheral regions of the fingerprint are cropped during the characterization step, such that only those features within and near the core are extracted, resulting in a minimized set of features being obtained.

At step 120 the global features that are identified in the first biometric information at step 113 are compared to the global features that are identified in the second biometric information at step 113, to identify changes in the global features occurring during the time period interval At between capture of the first and second fingerprint images. Significantly, the comparison at step 120 detects changes of the globally extracted features, which changes are occurring within the local reference frame.

When it is determined at step 121 that the first and second biometric information share global features that area substantial match, then a record-playback attack is identified and the biometric information source is registered as a latent fingerprint at step 125. The individual is rejected at step 126, and the method of FIG. 3 terminates at step 127.

When other than a match is determined at step 121, then at step 122 the characterized first and/or second biometric information is registered with stored templates to locate a template that, within a predetermined level of security in the form of a predetermined false acceptance rate, matches the characterized second biometric information. When it is determined at decision step 123 that the characterized first and/or second biometric information matches a stored template within the predetermined level of security, the individual is identified and a corresponding action is performed at step 124. Examples of corresponding actions include: granting system access; unlocking a door; logging access of the user; providing personal information; billing the individual, etc. Of course, when other than a match within the predetermined level of security is determined at decision step 123, a step 126 of refusing access to the individual is performed. The method of FIG. 3 terminates at step 127.

According to the method of FIG. 3, features, which are extracted in a global reference frame, are compared in order to detect changes that occur within a local reference frame during acquisition of fingerprint data. Preferably, these same features are used in characterizing fingerprints for registration thereof. In particular, changes that occur during the time interval At between capture of a first image of a fingerprint and a second image of the same fingerprint are detected. Since it is statistically very unlikely that two images of a fingerprint that are captured during a time period interval At will be identical, a live biometric source is recognized in dependence upon differences being detected between the first and second captured fingerprint images about the features used for characterization thereof. In particular, variations in the force that the user applies to the fingertip will cause the ridge-and-valley pattern of the fingerprint image to change slightly during the time period interval At between capturing the first image and the second image. As such, a fingerprint obtained from a live biometric source is expected to display motion of for example some features relative to other features. Types of motion include deformation of the fingerprint ridges, and/or rotational and/or translational motion of the entire fingerprint image.

It is an advantage of the method according to FIG. 3 that live biometric sources are identified in dependence upon detected differences within, for example the core region of the fingerprint, which core region is also used to authenticate the user. As such, an attempt by an unauthorized individual to modify the core data so as to induce changes therein may result in a latent fingerprint being accepted as a live fingerprint, however the core data, which is used to authenticate a user, will be altered and authentication will not occur. For instance, an unauthorized individual is prevented from simply "smudging" the peripheral region of a latent fingerprint in an attempt to "change" the latent fingerprint during image capture and thereby fool the system. Of course, when a global feature other than the core is used in the authorization process, movement and/or changes in the fingerprint about the global feature are analyzed to determine an absence of a latent fingerprint playback attack on the system.

Figure 4:
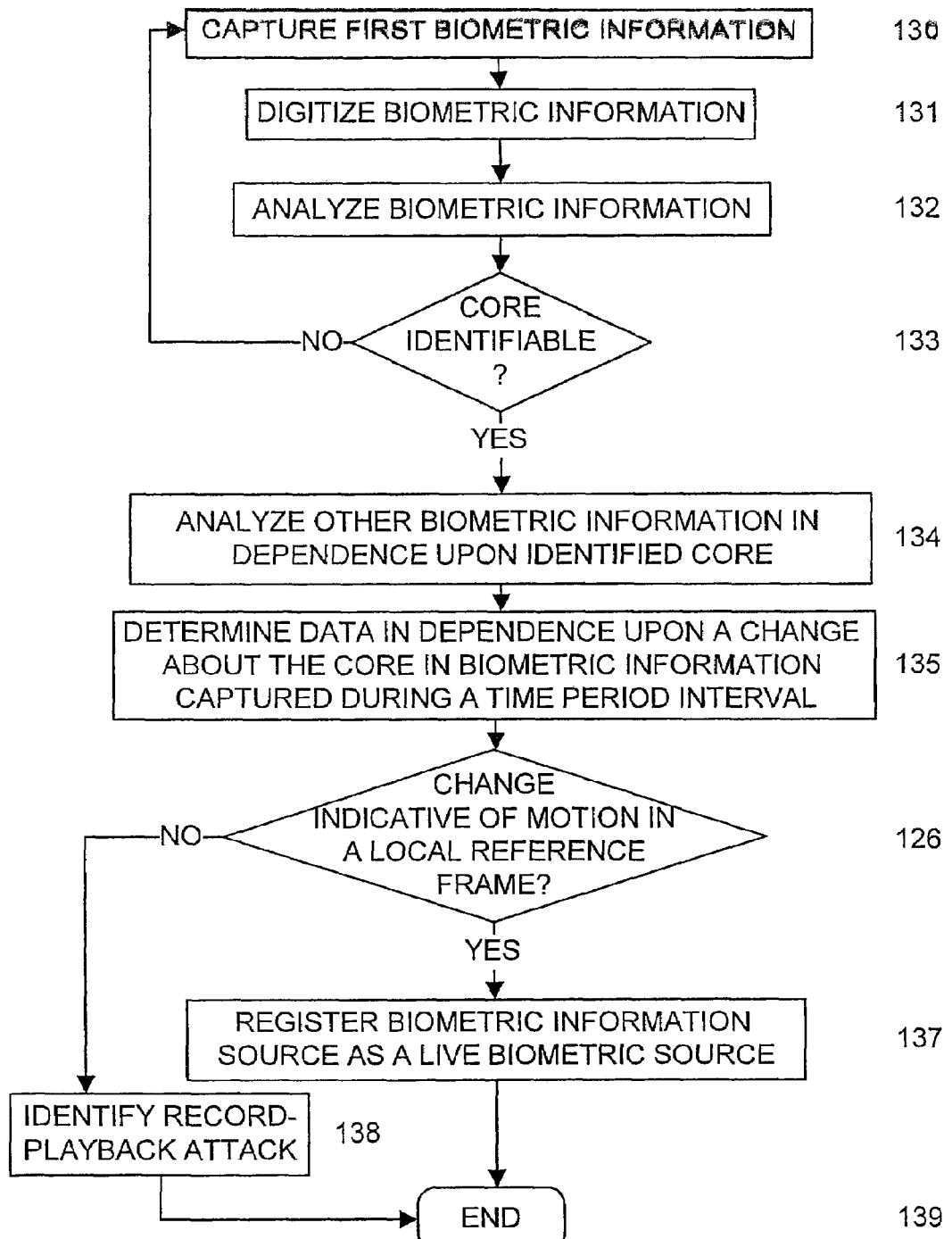

Referring now to FIG. 4, shown is a simplified flow diagram of a method for detecting record-playback of a latent fingerprint image according to the instant invention. The method of FIG. 4 is applicable to contact imagers in general. Contact imagers, as described above, are known in the art of electronic security.

Referring to FIG. 4, biometric information in the form of a fingerprint of a fingertip is captured at step 130 using a biometric information input device in the form of a contact imager. The biometric information is digitized at step 131. At step 132 the digitized fingerprint is analyzed to identify a global feature, such as for instance the core of the fingerprint. When the global feature is identifiable, the analysis includes the step of extracting the feature and its location. If it is determined at step 133 that the core is identifiable, then the extracted feature, having a known location, is used at step 134 to aid the analysis of other biometric information to identify and locate a same feature therein. For instance, biometric information captured previously at step 130 and stored in memory are retrieved and analyzed. Optionally, additional biometric information is captured using the biometric information input device in the form of a contact imager.

Having located a same global feature within at least two biometric information samples, the two samples captured at different times one from the other, then at step 135 data indicative of the extracted feature and its location is examined to detect changes, such as for instance motion of the feature during the time period interval Δt between capture of a first image of a fingerprint. Types of motion detected at step 126 include deformation of the fingerprint ridges that form the feature, and/or rotational and/or translational motion of the feature with respect to the platen. If the change is indicative of motion in the local reference frame, the biometric information source is identified as "live" at step 137; otherwise a record/playback attack is identified at step 138 and processing ends at step 139.

Of course, if it is determined at-step 133 that the core cannot be identified, additional biometric information is captured at step 130.

It is an advantage of the method according to FIG. 4 that live biometric sources are identified in dependence upon detected differences within the core region of the fingerprint, which core region is also used to authenticate the user. As such, an attempt by an unauthorized individual to modify the core data so as to induce changes therein may result in a latent fingerprint being accepted as a live fingerprint, however the core data, which is used to authenticate a user, will be altered and authentication will not occur. For instance, an unauthorized individual is prevented from simply "smudging" the peripheral region of a latent fingerprint in an attempt to "change" the latent fingerprint during image capture and thereby fool the system. Of course, when a global feature other than the core is used in the authorization process, movement and/or changes in the Fingerprint about the global feature are analyzed to determine an absence of a latent fingerprint playback attack on the system.

Optionally, more than two biometric information samples are captured and used with either of the methods described supra with reference to FIGS. 2 to 3. Comparing a larger plurality of biometric samples increases overall reliability of the determination of live biometric information sources. Further optionally, one of the first and second biometric information is in the form of a fingerprint image and the other of the first and second biometric information is in the form of a substantially overlapping partial fingerprint image.

Numerous other embodiments may be envisaged without departing from the spirit and scope of the invention.

The invention claimed is:

1. A method for preventing false acceptance of latent biometric information, comprising:
    sensing first biometric information from a first portion of a biometric information source;
    sensing second biometric information from a second portion of the biometric information source, each of the first and second portions including an overlapping same portion of the biometric information source, the first and second biometric information received at a different time one from the other;
    analyzing the first biometric information and/or second biometric information to identify a feature within the overlapping same portion for determining a reference frame for use in characterizing the first biometric information and/or the second biometric information;
    determining first data relating to the feature within the first biometric information and determining second data relating to the same feature within the second biometric information;
    comparing the first and second data to detect a difference between the first and second biometric information; and
    determining the biometric information source as a live biometric information source in dependence upon the detected difference, wherein the detected difference is indicative of relative motion of or about the feature within a local reference frame.

2. A method according to claim 1, wherein the biometric information source is in the form of a fingerprint of a fingertip and the first and second biometric information is in the form of first and second images of the fingerprint.

3. A method according to claim 2, wherein the overlapping same portion of the biometric information source includes a feature indicative of a core of the fingerprint.

4. A method according to claim 3, wherein one of the first and second biometric information is in the form of an image of a region of the fingerprint substantially smaller than a maximum imageable area of the fingerprint.

5. A method according to claim 2, wherein the feature that is identified by analyzing the first biometric information and/or the second biometric information is used to identify the same feature in the other one of the first and second biometric information.

6. A method according to claim 2, comprising digitizing the first and second biometric information.

7. A method according to claim 6, including:
    characterizing the first biometric information and/or the second biometric information based on the reference frame;
    registering the characterized biometric information with stored templates to provide a registration value; and if the registration value is indicative of an identity of an individual from whom the biometric information is received, identifying the individual.

8. A method according to claim 7, wherein characterizing includes:
identifying a feature indicative of the core of the fingerprint; and extracting the identified feature indicative of the core of the fingerprint.

9. A method according to claim 6, wherein said analyzing and determining first data and second data comprises:
characterizing the first biometric information and/or the second biometric information, including:
determining first data indicative of the identified feature and its location;
hashing the determined first data; and hashing second data from a same location of the other one of the first and second biometric information.

10. A method according to claim 9, wherein said comparing comprises comparing the hashed first data with the hashed second data.

11. A method according to claim 1, wherein the detected difference includes translation of the feature and rotation of the feature with respect to a platen of a biometric information input device.

12. A contact imaging device capable of preventing false acceptance of latent biometric information, comprising:
a biometric information input device capable of sensing first biometric information provided from a first portion of a biometric information source at a first time and of sensing second biometric information provided from a second portion of the biometric information source at a second time, each of the first and second portions including an overlapping same portion of the biometric information source; and
a processing device capable of analyzing the first biometric information and/or second biometric information to identify a feature within the overlapping same portion for determining a reference frame for use in characterizing the first biometric information and/or the second biometric information, determining first data relating to the feature within the first biometric information and determining second data relating to the same feature within the second biometric information, comparing the first and second data to detect a difference between the first and second biometric information, and determining the biometric information source as a live biometric information source in dependence upon the detected difference, wherein the detected difference is indicative of relative motion of or about the feature within a local reference frame.

13. A device according to claim 12, wherein the biometric information source is in the form of a fingerprint of a fingertip and the first and second biometric information is in the form of first and second images of the fingerprint.

14. A device according to claim 13, wherein the overlapping same portion of the biometric information source includes a feature indicative of a core of the fingerprint.

15. A device according to claim 14, wherein one of the first and second biometric information is in the form of an image of a region of the fingerprint substantially smaller than a maximum imageable area of the fingerprint.

16. A device according to claim 13, wherein the feature that is identified by analyzing the first biometric information and/or the second biometric information is used to identify the same feature in the other one of the first and second biometric information.

17. A device according to claim 12 wherein the processing device is capable of characterizing the first biometric information and/or the second biometric information based on a reference frame, registering the characterized biometric information with stored templates to provide a registration value; and if the registration value is indicative of an identity of an individual from whom the biometric information is received, identifying the individual.

18. A device according to claim 17, wherein the processor is capable of characterizing biometric information by identifying a feature indicative of the core of the fingerprint and extracting the identified feature indicative of the core of the fingerprint.

19. A device according to claim 17, wherein the processor is capable of characterizing the first biometric information and/or the second biometric information by determining first data indicative of the identified feature and its location, hashing the determined first data, and hashing second data from a same location of the other one of the first and second biometric information.

20. A device according to claim 19, wherein the processor is capable of comparing the hashed first data with the hashed second data.

21. A device according to claim 12, wherein the detected difference includes translation of the feature and rotation of the feature with respect to a platen of the biometric information input device.

22. A contact imaging device capable of preventing false acceptance of latent biometric information, comprising:
means for sensing first biometric information from a first portion of a biometric information source and for sensing second biometric information from a second portion of the biometric information source, each of the first and second portions including an overlapping same portion of the biometric information source, the first and second biometric information received at a different time one from the other; and
processing means for analyzing the first biometric information and/or second biometric information to identify a feature within the overlapping same portion for determining a reference frame for use in characterizing the first biometric information and/or the second biometric information, for determining first data relating to the feature within the first biometric information and determining second data relating to the same feature within the second biometric information, for comparing the first and second data to detect a difference between the first and second biometric information, and for determining the biometric information source as a live biometric information source in dependence upon the detected difference, wherein the detected difference is indicative of relative motion of or about the feature within a local reference frame.

23. A device according to claim 22, wherein the biometric information source is in the form of a fingerprint of a fingertip, the first and second biometric information is in the form of first and second images of the fingerprint, and the overlapping same portion of the biometric information source includes a feature indicative of a core of the fingerprint.

24. A device according to claim 23, wherein one of the first and second biometric information is in the form of an image of a region of the fingerprint substantially smaller than a maximum imageable area of the fingerprint.

25. A device according to claim 22, wherein the feature that is identified by analyzing the first biometric information and/or the second biometric information is used by the processing means to identify the same feature in the other one of the first and second biometric information.

26. A device according to claim 22, further comprising means for digitizing the first and second biometric information.

27. A device according to claim 26, wherein the processing means:
characterizes the first biometric information and/or the second biometric information based on the reference frame;
registers the characterized biometric information with stored templates to provide a registration value; and
if the registration value is indicative of an identity of an individual from whom the biometric information is received, identifies the individual.

28. A device according to claim 27, wherein the processing means:
identifies a feature indicative of the core of a fingerprint; and extracts the identified feature indicative of the core of the fingerprint.

29. A device according to claim 26, wherein the processing means characterizes the first biometric information and/or the second biometric information by:
determining first data indicative of the identified feature and its location;
hashing the determined first data; and
hashing second data from a same location of the other one of the first and second biometric information.

30. A device according to claim 29, wherein the processing means further compares the hashed first data with the hashed second data.

31. A device according to claim 22, wherein the detected difference includes translation of the feature and rotation of the feature by the processing means with respect to a platen of the sensing means.

32. A method for preventing access by unauthorized individuals to buildings, rooms, devices, or information, comprising:
sensing first biometric information from a first portion of a biometric information source of an individual;
sensing second biometric information from a second portion of the biometric information source of the individual, each of the first and second portions including an overlapping same portion of the biometric information source, the first and second biometric information received at a different time one from the other;
analyzing the first biometric information and/or second biometric information to identify a feature within the overlapping same portion for determining a reference frame for use in characterizing the first biometric information and/or the second biometric information;
determining first data relating to the feature within the first biometric information and determining second data relating to the same feature within the second biometric information;
comparing the first and second data to detect a difference between the first and second biometric information;
determining the biometric information source as a live biometric information source in dependence upon the detected difference, wherein the detected difference is indicative of relative motion of or about the feature within a local reference frame; and
determining that the individual is unauthorized if the biometric information source is not identified as a live biometric information source.

33. A method according to claim 32, wherein the biometric information source is in the form of a fingerprint of a fingertip of the individual and the first and second biometric information is in the form of first and second images of the fingerprint of the individual.

34. A method according to claim 33, wherein the overlapping same portion of the biometric information source of the individual includes a feature indicative of a core of the fingerprint of the individual.

35. A method according to claim 34, wherein one of the first and second biometric information is in the form of an image of a region of the fingerprint substantially smaller than a maximum imageable area of the fingerprint.

36. A method according to claim 33, wherein the feature that is identified by analyzing the first biometric information and/or the second biometric information is used to identify the same feature in the other one of the first and second biometric information.

37. A method according to claim 33, comprising digitizing the first and second biometric information.

38. A method according to claim 37, including:
characterizing the first biometric information and/or the second biometric information based on the reference frame;
registering the characterized biometric information with stored templates to provide a registration value; and if the registration value is indicative of an identity of the individual from whom the biometric information is received, identifying the individual.

39. A method according to claim 38, wherein characterizing includes:
identifying a feature indicative of the core of the fingerprint; and extracting the identified feature indicative of the core of the fingerprint.

40. A method according to claim 37, wherein said analyzing and determining first data and second data comprises:
characterizing the first biometric information and/or the second biometric information, including:
determining first data indicative of the identified feature and its location;
hashing the determined first data; and
hashing second data from a same location of the other one of the first and second biometric information.

41. A method according to claim 40, wherein said comparing comprises comparing the hashed first data with the hashed second data.

42. A method according to claim 32, wherein the detected difference includes translation of the feature and rotation of the feature with respect to a platen of a biometric information input device.

43. A security access system capable of preventing access by unauthorized individuals to buildings, rooms, devices, or information, comprising:
a biometric information input device capable of sensing first biometric information provided from a first portion of a biometric information source of an individual at a first time and of sensing second biometric information provided from a second portion of the biometric information source of the individual at a second time, each of the first and second portions including an overlapping same portion of the biometric information source; and
a processing device capable of analyzing the first biometric information and/or second biometric information to identify a feature within the overlapping same portion for determining a reference frame for use in characterizing the first biometric information and/or the second biometric information, determining first data relating to the feature within the first biometric information and determining second data relating to the same feature within the second biometric information, comparing the first and second data to detect a difference between the first and second biometric information, determining the biometric information source as a live biometric information source in dependence upon the detected difference, wherein the detected difference is indicative of relative motion of or about the feature within a local reference frame, and determining that the individual is unauthorized if the biometric information source is not identified as a live biometric information source.

44. A system according to claim 43, wherein the biometric information source is in the form of a fingerprint of a fingertip of the individual and the first and second biometric information is in the form of first and second images of the fingerprint of the individual.

45. A system according to claim 44, wherein the overlapping same portion of the biometric information source includes a feature indicative of a core of the fingerprint of the individual.

46. A system according to claim 45, wherein one of the first and second biometric information is in the form of an image of a region of the fingerprint substantially smaller than a maximum imageable area of the fingerprint of the individual.

47. A system according to claim 44, wherein the feature that is identified by analyzing the first biometric information and/or the second biometric information is used to identify the same feature in the other one of the first and second biometric information.

48. A system according to claim 43, wherein the processing device is capable of characterizing the first biometric information and/or the second biometric information based on a reference frame, registering the characterized biometric information with stored templates to provide a registration value; and if the registration value is indicative of an identity of the individual from whom the biometric information is received, identifying the individual.

49. A system according to claim 48, wherein the processor is capable of characterizing biometric information by identifying a feature indicative of the core of the fingerprint of the individual and extracting the identified feature indicative of the core of the fingerprint of the individual.

50. A system according to claim 48, wherein the processor is capable of characterizing the first biometric information and/or the second biometric information by determining first data indicative of the identified feature and its location, hashing the determined first data, and hashing second data from a same location of the other one of the first and second biometric information.

51. A system according to claim 50, wherein the processor is capable of comparing the hashed first data with the hashed second data.

52. A system according to claim 43, wherein the detected difference includes translation of the feature and rotation of the feature with respect to a platen of the biometric information input device.

53. A computer readable medium containing instructions what when processed by a processor cause said processor to perform a method for preventing false acceptance of latent biometric information, comprising:
sensing first biometric information from a first portion of a biometric information source;
sensing second biometric information from a second portion of the biometric information source, each of the first and second portions including an overlapping same portion of the biometric information source, the first and second biometric information received at a different time one from the other;
analyzing the first biometric information and/or second biometric information to identify a feature within the overlapping same portion for determining a reference frame for use in characterizing the first biometric information and/or the second biometric information;
determining first data relating to the feature within the first biometric information and determining second data relating to the same feature within the second biometric information;
comparing the first and second data to detect a difference between the first and second biometric information; and
determining the biometric information source as a live biometric information source in dependence upon the detected difference, wherein the detected difference is indicative of relative motion of or about the feature within a local reference frame.

54. A computer readable medium according to claim 53, further including instructions for:
digitizing the first and second biometric information;
characterizing the first biometric information and/or the second biometric information based on the reference frame;
registering the characterized biometric information with stored templates to provide a registration value; and
if the registration value is indicative of an identity of an individual from whom the biometric information is received, identifying the individual.

55. A computer readable medium according to claim 54, wherein said instructions for characterizing the first biometric information and/or the second biometric information include instructions for:
determining first data indicative of the identified feature and its location;
hashing the determined first data; and
hashing second data from a same location of the other one of the first and second biometric information.

56. A computer readable medium containing instructions what when processed by a processor cause said processor to perform a method for preventing access by unauthorized individuals to buildings, rooms, devices, or information, comprising:
sensing first biometric information from a first portion of a biometric information source of an individual;
sensing second biometric information from a second portion of the biometric information source of the individual, each of the first and second portions including an overlapping same portion of the biometric information source, the first and second biometric information received at a different time one from the other;
analyzing the first biometric information and/or second biometric information to identify a feature within the overlapping same portion for determining a reference frame for use in characterizing the first biometric information and/or the second biometric information;
determining first data relating to the feature within the first biometric information and determining second data relating to the same feature within the second biometric information;
comparing the first and second data to detect a difference between the first and second biometric information;
determining the biometric information source as a live biometric information source in dependence upon the detected difference, wherein the detected difference is indicative of relative motion of or about the feature within a local reference frame; and determining that the individual is unauthorized if the biometric information source is not identified as a live biometric information source.

57. A computer readable medium according to claim 56, further including instructions for:

digitizing the first and second biometric information;

characterizing the first biometric information and/or the second biometric information based on the reference frame;

registering the characterized biometric information with stored templates to provide a registration value; and if the registration value is indicative of an identity of the individual from whom the biometric information is received, identifying the individual.

58. A computer readable medium according to claim 57, wherein said instructions for characterizing the first biometric information and/or the second biometric information include instructions for:

determining first data indicative of the identified feature and its location;

hashing the determined first data; and hashing second data from a same location of the other one of the first and second biometric information.

* * * * *